United States Patent [19]

Weaver et al.

[11] Patent Number: 4,745,173

[45] Date of Patent: May 17, 1988

[54] CONDENSATION COPOLYMERS CONTAINING 2,5-DIARYLAMINOTEREPHTHALIC ACID TYPE COLORANTS AND PRODUCTS THEREFROM

[75] Inventors: Max A. Weaver; Wayne P. Pruett, both of Kingsport; Samuel D. Hilbert, Jonesborough, all of Tenn.

[73] Assignee: Eastman Kodak Company, Rochester, N.Y.

[21] Appl. No.: 17,959

[22] Filed: Feb. 24, 1987

[51] Int. Cl.$^4$ .................. C08G 63/44; C08G 69/44; C08G 63/52

[52] U.S. Cl. .................. 528/288; 524/602; 528/290; 528/291; 528/292; 528/303; 528/304

[58] Field of Search .............. 528/288, 290, 291, 292, 528/303, 304

[56] References Cited

U.S. PATENT DOCUMENTS

| | | | |
|---|---|---|---|
| 4,284,729 | 8/1981 | Cross et al. | 521/158 |
| 4,359,570 | 11/1982 | Davis et al. | 528/289 |
| 4,371,690 | 2/1983 | Anderson et al. | 528/190 |
| 4,377,669 | 3/1983 | Zweifel et al. | 525/445 |
| 4,456,746 | 6/1984 | Horner | 528/128 |
| 4,523,008 | 6/1985 | Vogl et al. | 528/288 |

*Primary Examiner*—Lucille M. Phynes
*Attorney, Agent, or Firm*—William P. Heath, Jr.; John F. Stevens; J. Frederick Thomsen

[57] ABSTRACT

A composition useful for molding into articles such as food containers, soft drink bottles, cured structural plastics and the like, comprising molding or fiber grade linear or unsaturated polyester or polycarbonate having copolymerized therein a total of from 1.0 to about 20,000 ppm, of the reactant residue moieties of one or a mixture of colorants of the formula

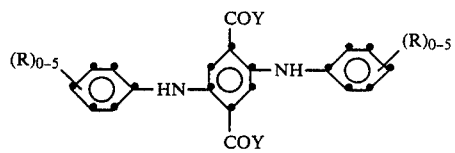

wherein: each R when present as a substituent, is selected from alkyl, aralkyl, cycloaliphatic, aryl, or the like; and Y is hydroxyl, alkoxy, halogen or the like completing a condensable group.

15 Claims, No Drawings

CONDENSATION COPOLYMERS CONTAINING 2,5-DIARYLAMINOTEREPHTHALIC ACID TYPE COLORANTS AND PRODUCTS THEREFROM

TECHNICAL FIELD

This invention concerns condensation polymers including linear polyester, unsaturated polyester, and polycarbonate types, wherein certain 2,5-diarylaminoterephthalic acid type colorants have been copolymerized (condensed) into the polymer to impart thereto a variety of shades ranging from orange to red. The present colorants are thermally stable and non-sublimable at the polymer processing (includes preparation) temperatures and are non-extractable therefrom, thus rendering the polymers particularly suitable for use as beverage bottles and food, pharmaceutical and cosmetic containers. The present colorants are useful in total concentrations (of single colorant or mixtures thereof), given herein in parts per million (ppm), ranging from about 1.0 to about 20,000, preferably 100 to about 3,000 ppm (parts by weight of colorant per million parts by weight of final polymer).

BACKGROUND ART

Heretofore, various colorants, typically copolymerizable anthraquinone derivatives have been incorporated into polymers as disclosed in U.S. Pat. Nos. 3,401,142; 3,424,708; 3,359,230; 3,372,138; and 4,116,923. While these colorants may function adequately for certain end use applications, there is a need for less expensive and less complex colorants of the orange to red hues for use in beverage bottles and the like, especially where the colorants are to be blended with other colorants such as to give the highly preferred amber bottle color.

DISCLOSURE OF INVENTION

The present linear polymers are thermoplastic molding or fiber grade having an I.V. of from about 0.4 to about 1.2, and preferably are polyesters wherein the acid moiety is comprised of at least about 50 mol % terephthalic acid residue, and the glycol moiety at least about 50 mol % ethylene glycol or 1,4-cyclohexanedimethanol residue, and containing a total of from about 1.0 to about 20,000 ppm of one or a mixture of the present colorants. The term "acid" as used herein with respect to both the linear and unsaturated polyesters includes their various reactive derivatives such as dimethylterephthalate, anhydrides and the like. A highly preferred polyester within this preferred group is comprised of from about 75 to 100 mol % terephthalic acid residue and from about 75 to 100 mol % ethylene glycol residue.

In accordance with the present invention, the colorant moieties are derived from the reactants shown below which have molecular weights of from about 348 to about 400 although higher molecular weights are also operable. The reactants (monomers) have one or more groups which condense during condensation or polycondensation to enter the moiety into the polymer chain. These groups include carboxyl, carboxylic ester, acid halide and the like. As aforesaid, these moieties are thermally stable at polymer processing conditions, which includes polycondensation temperatures of up to about 300° C. which are used, for example, in the preparation of polyesters such as poly(ethylene terephthalate) and copolymers of terephthalic acid, ethylene glycol, and 1,4-cyclohexanedimethanol.

The present invention is defined in its broad embodiment as a composition comprising molding or fiber grade condensation polymer having copolymerized therein a total of from 1.0 to about 20,000 ppm, of the reactant residue moieties of one or a mixture of reactants of the formula

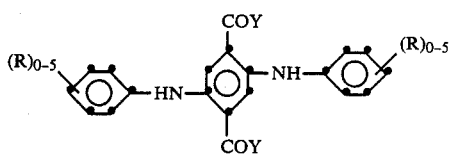

wherein:
each Y is selected from hydroxyl, alkoxy, allyloxy, aryloxy, cycloalkyloxy, or halogen, preferably hydroxyl or alkoxy;
each R when present as a substituent, is selected from: alkyl; aryl; cyclohexyl; cyclohexyloxy; alkoxy; alkoxycarbonyl; halogen; alkylthio; aryloxy; arylthio; cyclohexylthio; alkanoyl; aroyl; cyano; hydroxyalkyl; hydroxyalkoxy; hydroxyalkylthio; trifluoromethyl; —NR²R³ wherein R² and R³ are independently selected from hydrogen, alkanoyl, alkoxycarbonyl, alkylsulfonyl, aroyl, alkylcarbamoyl, dialkylcarbamoyl, alkyl, aryl, cycloalkyl, arylsulfonyl or cyclohexylcarbonyl; —CONR₄R⁵ or —SO₂NR⁴R⁵ wherein R⁴ and R⁵ are independently selected from hydrogen, alkyl, aryl or cycloalkyl;

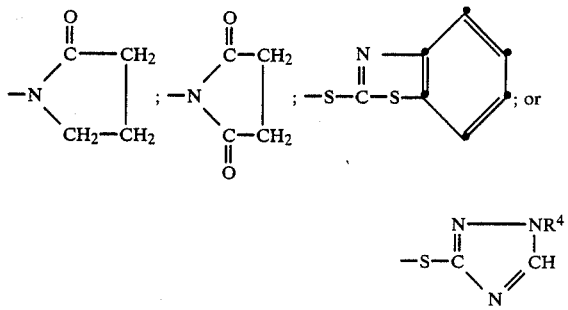

wherein R⁴ is as defined above;
wherein each alkyl, aryl, or cycloalkyl moiety or portion of a group or radical may be substituted where appropriate with 1–3 of hydroxyl, hydroxyalkoxy, hydroxyalkyl, alkanoylamino, acylamino, acyloxy, cyano, alkoxycarbonyl, halogen, alkoxy, alkoxyalkoxy, aryl, aryloxy, or cycloalkyl; and
wherein in the above definitions the alkyl moieties or portions of the various groups contain from 1–8 carbons, preferably 1–4, straight or branched chain, the aryl nuclei contain from 4–10 carbons, preferably 6, and the cycloalkyl nuclei contain from 4–6 carbons, preferably 6.

The colorants of the invention are prepared by two convenient routes illustrated below and previously disclosed by J. Lenoir in "The Chemistry of Synthetic Dyes," Vol. 5, K. Venkataraman, editor, Academic Press, New York and London, 1971, pp 404–406, wherein X is halogen and R₁ is alkyl.

Route 1

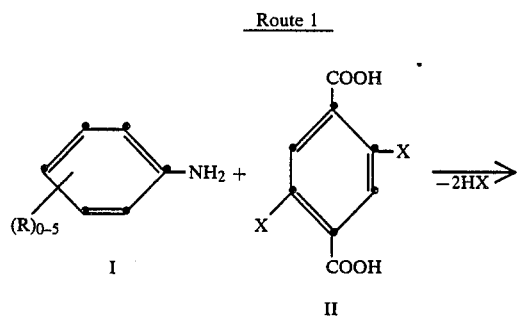

I    II

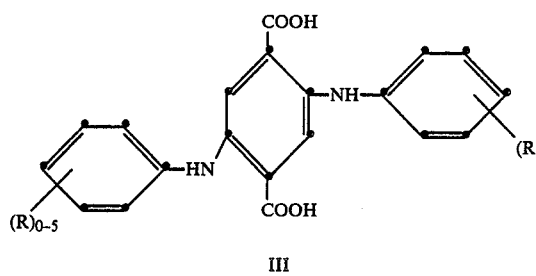

III

Route 2

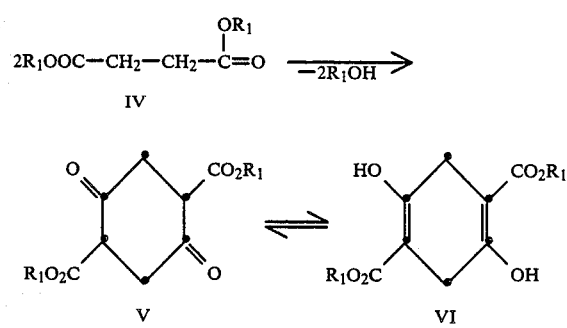

IV    V    VI

Compound VI +

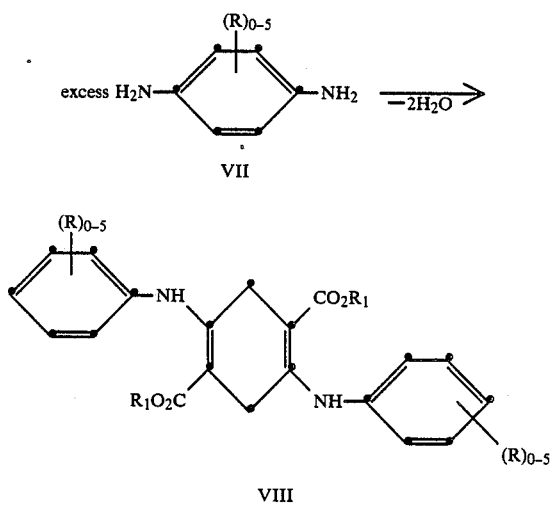

VII

VIII

Compound VIII $\xrightarrow{-H_2}$

-continued
Route 2

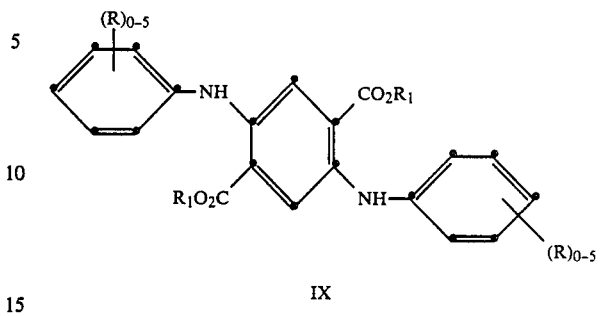

IX

In Route 1, a 2,5-dihalogenoterephthalic acid is reacted with an excess aniline or a substituted aniline compound. In Route 2, two moles of dialkylsuccinate are condensed in the presence of a sodium alkoxide to give 2,5-bis(alkoxycarbonyl)cyclohexane-1,6-dione which reacts with excess aniline or substituted anilines to give the subject compounds. Table 1 below illustrates the scope of colorants suitable for use in accordance with the present invention.

The nonextractabilities of the present colorant moieties are determined as follows:

Extraction Procedure

All extractions are done in glass containers with distilled solvents under the time and temperature conditions described below. The sample form is ½ inch×2½ inch segments cut from the cylindrical side wall portion of 2-liter bottles. All samples are washed with cold solvent to remove surface contaminants and are exposed using 200 ml. solvent/100 in.$^2$ surface area (2 ml/in.$^2$).

Solvent blanks are run under the same extraction conditions without polymer. In most cases samples were extracted, spiked, with a known amount of additive as a control, and analyzed in duplicates.

Extraction Conditions

1. Water

The samples at room temperature are added to solvent and heated at 250° F. for two hours. Half of the samples are then analyzed and the remainder are placed in a 120° F. oven for 30 days and then analyzed.

2. 50% Ethanol/Water

The samples at room temperature are added to the solvent at room temperature, placed in an oven at 120° F. and analyzed after 24 hours and 30 days.

3. Heptane.

The samples at room temperature are added to solvent at room temperature and heated at 150° F. for two hours. Part of the samples are cooled to room temperature and analyzed spectrophotometrically and the remainder are allowed to age at 120° F. for 30 days before analysis.

4. Any suitable analytical technique and apparatus may be employed to determine the amount of colorant moiety extracted from the polymer.

The extractability of the present colorant moieties from the present polymers was found to be essentially nonexistent.

Polyesters useful in this invention include linear, thermoplastic, crystalline, or amorphous materials, produced by conventional techniques using one or more diols and one or more dicarboxylic acids, copolymerized with the colorant moieties.

Also useful are the unsaturated, curable polyesters which are the polyesterification products of one or more dihydric alcohols and one or more unsaturated dicarboxylic acids or their anhydrides, and the term "polyester resin" is used herein to define the unsaturated polyester dissolved in or admixed with an ethylenically unsaturated monomer. Typical of the unsaturated polyesters is the polyesterification product of (a) 1,4-cyclohexanedimethanol and/or 2,2-dimethyl-1,3-propanediol and optionally an additional dihydric alcohol, such as ethylene glycol, and (b) maleic acid or fumaric acid and an unsaturated hydrogenated aromatic dicarboxylic acid, which when crosslinked with an ethylenically-unsaturated monomer, e.g., styrene, produces a cured polyester resin which has, for example, high thermal resistance, high heat distortion values, excellent electrical and mechanical properties, and excellent resistance to chemicals.

The unsaturated polyester resins may be prepared in the presence of gelation inhibitors such as hydroquinone or the like, which are well known in the art of polyesterification. The esterification may be carried out for example under an inert blanket of gas such as nitrogen in a temperature range of 118°–220° C. for a period of about 6–20 hours until an acid number below 100 and preferably below 50 is obtained, based on milliequivalents of KOH necessary to neutralize 1 gram of the unsaturated polyester. The resulting polyester may be subsequently copolymerized, crosslinked, or cured with "curing amounts" of any of the well-known ethylenically unsaturated monomers used as solvents for the polyester. Examples of such monomers include styrene, alpha-methyl styrene, vinyl toluene, divinyl benzene, chlorostyrene, and the like as well as mixtures thereof. Typically, the mole ratio of such unsaturated monomer to the unsaturated moiety (e.g., maleic acid residue) in the polyester is from about 0.5 to about 3.0, although the "curing amounts" of such monomer can be varied from these ratios.

It is preferred that the unsaturated polyester be prepared from one or more dihydric alcohols, fumaric or maleic acid or mixtures thereof, and up to about 60 mole percent of total acid component of o-phthalic, iso-phthalic or terephthalic acids or mixtures thereof. Preferred for the dihydric alcohol component is one or a mixture of propylene glycol, neopentyl glycol, 2,2,4-trimethyl-1,3-pentanediol, ethylene glycol, or diethylene glycol. A specific preferred unsaturated polyester is prepared from about 75 to 100 mol % propylene glycol, and as the acid component, from about 75 to 100 mol % o-phthalic and maleic acids in a mole ratio of from about ½ to about 2/1. Typical of these unsaturated polyesters are those disclosed, for example, in U.S. Pat. No. 4,359,570 incorporated herein by reference.

The diol components of the linear polyester are selected, for example, from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl) tricyclo[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 12 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, it is often preferable to use a functional acid derivative thereof such as the dimethyl, diethyl, or dipropyl ester of the dicarboxylic acid. The anhydrides of these acids also can be employed where practical.

The preferred linear copolyesters are especially useful for making blow molded bottles or containers for beverages, and for molded food packages and the like. In this regard, certain of these copolyesters are color, I.V., and heat distortion or "hot fill" stable at temperatures of up to about 100° C., when properly heat set and molded articles therefrom exhibit good thin wall rigidity, excellent clarity and good barrier properties with respect to water and atmospheric gases, particularly carbon dioxide and oxygen.

In regard to products having the "hot fill" stability, the most preferred linear polyesters therefor comprise poly(ethylene terephthalate) and this polymer modified with up to about 5 mole % of 1,4-cyclohexanedimethanol, wherein the polymers have been sufficiently heat set and oriented by methods well known in the art to give a desired degree of crystallinity. By definition, a polymer is "hot fill" stable at a prescribed temperature when less than 2% change in volume of a container manufactured therefrom occurs upon filling the same with a liquid at that temperature. For the particular application of blow-molded beverage bottles, the most preferred polyesters have an I.V. of 0.65 to 0.85, and a Tg of >70° C., and film sections cut from the bottle have a Water Vapor Transmission Rate of 1.5 to 2.5 g. mills/100 in.$^2$ – 24 hrs., a $CO_2$ Permeability of 20–30 cc. mils/100 in.$^2$ – 24 hrs.-atm., and an $O_2$ Permeability of 4–8 cc. mils/100 in.$^2$ – 24 hrs.-atm. The Tg is determined by Differential Scanning Calorimetry at a scan rate of 20 Centigrade Degrees/min., the $O_2$ Permeability by the standard operating procedure of a MOCON OXTRAN 100 instrument of Modern Controls, Inc., of Elk River, Minnesota, and the $CO_2$ Permeability by the standard operating procedure of a MOCON PERMATRAN C II, also of Modern Controls.

Typical polycarbonates useful herein are disclosed in Kirk-Othmer Encyclopedia of Chemical Technology, third edition, Volume 18, pages 479–494, incorporated herein by reference.

The inherent viscosities (I.V.) of each of the copolyesters herein are determined according to ASTM D2857-70 procedure in a Wagner Viscometer of Lab Glass Inc. of Vineland, N.J. having a ½ ml capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution of 25° C. and measuring the time of flow at 25° C. The I.V. is calculated from the equation $$\{\eta\}^{25°\,C}_{0.50\%} = \frac{\ln \frac{t_s}{t_o}}{C}$$

where:
- $\{\eta\}$ = Inherent viscosity at 25° C. at a polymer concentration of 0.5 g./100 ml. of solvent;
- ln = Natural logarithm;
- $t_s$ = Sample flow time;
- $t_o$ = Solvent-blank flow time; and
- C = Concentration of polymer in grams per 100 ml. of solvent = 0.50.

BEST MODES FOR PRACTICING THE INVENTION

EXAMPLE 1

Preparation of Poly(ethylene terephthalate) Copolymerized With 2,5-Dianilinoterephthalic Acid The following compounds are placed in a 500-mL, single-necked, round-bottom flask:
- 97 g (0.5 mol) dimethyl terephthalate
- 62 g (1.0 mol) ethylene glycol
- 0.0192 g 2,5-dianilinoterephthalic acid
- 0.29 mL of a n-butanol solution of acetyl triisopropyl titanate which contains 0.03 g titanium per mL The flask is equipped with a nitrogen inlet, metal stirrer, vacuum outlet, and condensing flask. The flask and contents are heated at 200° C. in a Belmont metal bath for 60 minutes, at 210° C. for 75 minutes, and at 230° C. for 50 minutes with a nitrogen sweep over the reaction mixture while the ester interchange takes place. The metal bath temperature is increased to 270° C. At 270° C., vacuum with a stream of nitrogen bleeding in the system is applied slowly over a 10-minute period until the pressure is reduced to 100 mm Hg. The flask and contents are heated at 270° C. under a pressure of 100 mm Hg for 30 minutes. The metal bath temperature is increased to 285° C. and the pressure is slowly reduced over a 10-minute period to 4 to 5 mm Hg. The flask and contents are heated at 285° C. under a pressure of 4 to 5 mm Hg for 25 minutes. Then the pressure is reduced to 0.3 to 0.5 mm Hg and polycondensation is continued at 285° C. for 16 minutes. The polymer is removed from the bath and is allowed to cool in nitrogen atmosphere while the polyester crystallizes. The resulting polymer is orange colored and has an inherent viscosity of 0.66 measured in a 60/40 ratio by weight of phenol/tetrachloroethane at a concentration of 0.5 g per 100 mL. An U.V. visible spectrum on amorphous film of the polymer shows a strong absorption peak at 485 nm.

EXAMPLE 2

Preparation of Poly(ethylene terephthalate) Copolymerized with Diethyl-2,5-dianilinoterephthalate The following compounds are placed in a 500-mL, single-necked, round-bottom flask:
- 97 g (0.5 mol) dimethyl terephthalate
- 62 g (1.0 mol) ethylene glycol
- 0.0192 g diethyl-2,5-dianilinoterephthalate
- 0.29 mL of a n-butanol solution of acetyl triisopropyl titanate which contains 0.03 g titanium per mL The ester interchange and polymerization of this polymer are carried out as in Example 1. The resulting polymer is orange colored and has an inherent viscosity of 0.66. An U.V. visible spectrum on amorphous film of the polymer shows a strong absorption peak at 480 nm.

The following table gives further examples of specific compounds useful herein.

TABLE 1

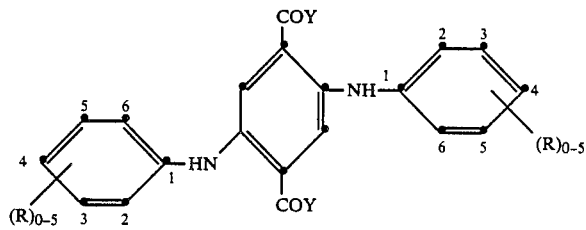

| Example Number | Y  | R |
|---|---|---|
| 3  | OH | 4-CH$_3$ |
| 4  | OH | 2-OC$_2$H$_5$ |
| 5  | OH | 3-CH$_3$ |
| 6  | OH | 2,4-di-CH$_3$ |
| 7  | OH | 2,5-di-OCH$_3$ |
| 8  | OH | 2,5-di-Cl |
| 9  | OH | 2,4-di-OC$_2$H$_5$ |
| 10 | Cl | 4-Cl |
| 11 | OH | 3-Br |
| 12 | OH | 3-CF$_3$ |
| 13 | OH | 4-C$_2$H$_5$ |
| 14 | OH | 4-S—C$_4$H$_9$—n |
| 15 | OH | 4-OC$_6$H$_5$ |
| 16 | OH | 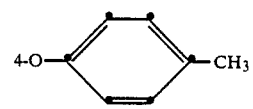 |

TABLE 1-continued

[Structure: central benzene ring with COY groups (positions with COY top and bottom) and two NH-linked phenyl rings bearing (R)₀₋₅ substituents, with numbered positions 1-6 on each phenyl]

| Example Number | Y | R |
|---|---|---|
| 17 | OH | 4-S—(phenyl) |
| 18 | OH | 4-(thiophene, S) |
| 19 | OH | 4-$C_6H_5$ |
| 20 | OH | 4-$OC_2H_4OCH_3$ |
| 21 | OH | 4-$OC_2H_4OH$ |
| 22 | OH | 4-$NHCOCH_3$ |
| 23 | OH | 3-$NHCOC_2H_5$ |
| 24 | OH | 4-$NHCO_2C_2H_5$ |
| 25 | OH | 4-$NHSO_2CH_3$ |
| 26 | OH | 4-$NHCOC_6H_5$ |
| 27 | OH | 3-$NHCONHC_2H_5$ |
| 28 | OH | 3-$N(CH_3)COCH_3$ |
| 29 | OH | 3-$NHSO_2C_6H_5$ |
| 30 | OH | 4-$NHCOC_6H_{11}$ |
| 31 | $OCH_3$ | 2-$CH_3$, 3-Cl |
| 32 | $OCH_3$ | 3-$COCH_3$ |
| 33 | $OC_2H_5$ | 3-$COC_6H_5$ |
| 34 | $OCH_2CH_2CH_3$ | 2-$OCH_3$, 5-$CH_3$ |
| 35 | $OCH_2CH_2OH$ | 3-Cl |
| 36 | $OCH_2CH_2OCH_3$ | 4-$C_2H_4OH$ |
| 37 | $OCH(CH_3)_2$ | 2-$C_2H_4OH$ |
| 38 | $OCH_2C_6H_5$ | 3-CN |
| 39 | $OCH_2CH_2C_6H_5$ | 3-$CON(C_2H_5)_2$ |
| 40 | $OCH_2CH_2Cl$ | 3-$CON(CH_3)_2$ |
| 41 | $OCH_2C_6H_{11}$ | 3-$SO_2N(C_2H_5)_2$ |
| 42 | $OCH_2CH_2OC_2H_5$ | 3-$CON(CH_3)C_6H_5$ |
| 43 | $OC_2H_5$ | 4-N(succinimido, pyrrolidinedione ring: N—C(=O)—CH₂—CH₂—CH₂—) |
| 44 | $OCH_2CH=CH_2$ | 3-N(succinimido: N—C(=O)—CH₂—CH₂—C(=O)—) |
| 45 | $OC_2H_5$ | 4-S—C(=N—)—S— (benzothiazol-2-ylthio) |
| 46 | $OC_2H_5$ | 4-S—C(1,2,4-triazol-3-yl: N=CH—NH—N=) |
| 47 | $OC_6H_{11}$ | 3-$CO_2C_2H_5$ |

TABLE 1-continued

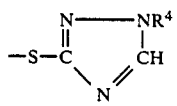

| Example Number | Y | R |
|---|---|---|
| 48 | 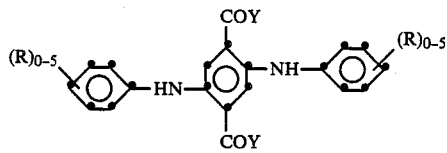 | 3-CH$_3$ |
| 49 | OCH$_2$CH$_2$CN | 4-OC$_2$H$_5$ |
| 50 | OCH$_2$CH(CH$_3$)$_2$ | 4-O(CH$_2$)$_5$CH$_3$ |

While the invention has been described in detail with particular reference to preferred embodiments thereof, it will be understood that variations and modifications can be effected within the spirit and scope of the invention.

We claim:

1. A composition comprising molding or fiber grade condensation polymer having copolymerized therein a total of from 1.0 to about 20,000 ppm, of the reactant residue moieties of one or a mixture of colorants of the formula wherein:
 each Y is selected from hydroxyl, alkoxy, allyloxy, aryloxy, cycloalkyloxy, or halogen;
 each R when present as a substituent, is selected from alkyl; aryl; cyclohexyl; cyclohexyloxy; alkoxy; alkoxycarbonyl; halogen; alkylthio; aryloxy; arylthio; cyclohexylthio; alkanoyl; aroyl; cyano; hydroxyalkyl; hydroxyalkoxy; hydroxyalkylthio; trifluoromethyl; —NR$^2$R$^3$ wherein R$^2$ and R$^3$ are independently selected from hydrogen, alkanoyl, alkoxycarbonyl, alkylsulfonyl, aroyl, alkylcarbamoyl, dialkylcarbamoyl, alkyl, aryl, cycloalkyl, arylsulfonyl or cyclohexylcarbonyl; —CONR$^4$R$^5$ or —SO$_2$NR$^4$R$^5$ wherein R$^4$ and R$^5$ are independently selected from hydrogen, alkyl, aryl or cycloalkyl;

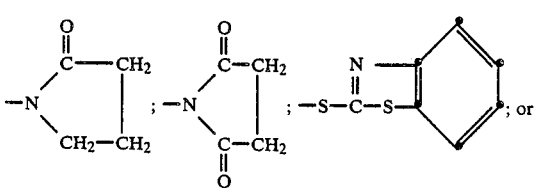

-continued wherein R$^4$ is as defined above;
 wherein each alkyl, aryl, or cycloalkyl moiety or portion of a group or radical may be substituted where appropriate with 1–3 of hydroxyl, hydroxyalkoxy, hydroxyalkyl, alkanoylamino, acylamino, acyloxy, cyano, alkoxycarbonyl, halogen, alkoxy, alkoxyalkoxy, aryl, aryloxy, or cycloalkyl; and
 wherein in the above definitions the alkyl moieties or portions of the various groups contain from 1–8 carbons, straight or branched chain, the aryl nuclei contain from 4–10 carbons, and the cycloalkyl nuclei contain from 4–6 carbons.

2. The composition of claim 1 wherein:
 each Y is hydroxyl or alkoxy; and the anilino rings are unsubstituted or substituted with one or two R groups independently selected from alkyl, alkoxy, halogen or acylamino.

3. The composition of claim 1 wherein the polymer is linear polyester, each R when present as a substituent, is independently selected from alkyl of 1–4 carbons, and Y is hydroxyl.

4. The composition of claim 1 wherein the polymer is linear polyester, and the colorant has the structure

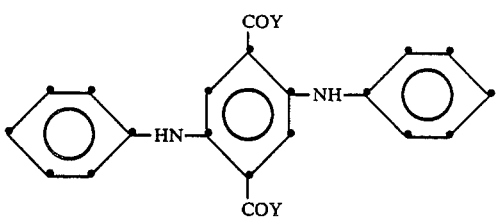

wherein Y is hydroxyl or alkoxy of 1–4 carbons.

5. The composition of claim 1 wherein the total amount of colorant moiety present is from about 100 to about 3,000 ppm.

6. The composition of any one of claims 1–4 wherein the polyester acid moiety is comprised of at least about 50 mol % terephthalic acid residue, and the glycol moiety at least about 50 mol % ethylene glycol or 1,4-cyclohexanedimethanol residue, and the polyester contains a total of from about 100 to about 3,000 ppm of one or a mixture of the colorant moieties.

7. The composition of any one of claims 1-5 wherein the polyester is comprised of from about 75 to 100 mol % terephthalic acid residue and from about 75 to 100 mol % ethylene glycol residue.

8. The composition of claim 1 wherein the polymer is unsaturated polyester having an acid moiety comprised of fumaric or maleic acid or mixtures thereof and up to about 60 mol % of one or a mixture of o-phthalic, isophthalic, or terephthalic acids, and having a glycol moiety comprised of one or a mixture of propylene glycol, neopentyl glycol, 2,2,4-trimethyl-1,3-pentanediol, ethylene glycol or diethylene glycol.

9. The composition of claim 8 wherein the acid moiety is comprised of from about 75 to 100 mol % o-phthalic acid and maleic acid in a mole ratio of from about ½ to about 2/1, and the glycol moiety is comprised of from about 75 to 100 mol % propylene glycol.

10. The composition of claim 9 containing a curing amount of an ethylenically unsaturated monomer.

11. A cured, formed article of the composition of claim 10.

12. A formed article of the composition of claim 1.

13. A formed article of the composition of claim 6.

14. A formed article of the composition of claim 7.

15. A formed article of the composition of claim 8.

* * * * *